United States Patent
Mao et al.

(10) Patent No.: US 12,443,405 B2
(45) Date of Patent: Oct. 14, 2025

(54) CASCADING ADAPTIVE TIMELINE GENERATION AND SOLVING

(71) Applicant: State Farm Mutual Automobile Insurance Company, Bloomington, IL (US)

(72) Inventors: Wesley Mao, Murphy, TX (US); Stephen Richard Jones, McKinney, TX (US); Daniel Joseph Sanders, McKinney, TX (US); Milo Harper Skalicky, Richardson, TX (US); Ronald Patrick Allen, Allen, TX (US); Sarah Lynn Richards, Arlington, TX (US); Kevin Michael Arnold, Van Alstyne, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 110 days.

(21) Appl. No.: 17/871,831

(22) Filed: Jul. 22, 2022

(65) Prior Publication Data
US 2023/0021530 A1    Jan. 26, 2023

Related U.S. Application Data (60) Provisional application No. 63/225,393, filed on Jul. 23, 2021.

(51) Int. Cl.
*G06F 8/77* (2018.01)
*G06Q 10/0631* (2023.01)

(52) U.S. Cl.
CPC ......... *G06F 8/77* (2013.01); *G06Q 10/06311* (2013.01)

(58) Field of Classification Search
CPC .... G06F 8/77; G06F 8/20; G06F 8/70; G06Q 10/06311
See application file for complete search history.

(56) References Cited

U.S. PATENT DOCUMENTS

| | | | |
|---|---|---|---|
| 2016/0077832 A1* | 3/2016 | Bhattacharyya | G06Q 10/06 717/101 |
| 2018/0046455 A1* | 2/2018 | Walsh | G06F 16/22 |
| 2018/0082242 A1* | 3/2018 | Strange | G06Q 10/06315 |
| 2021/0117907 A1* | 4/2021 | Gray | G06Q 10/063118 |
| 2022/0318712 A1* | 10/2022 | Alamir | G06Q 10/06312 |

OTHER PUBLICATIONS

Gnat; How to communicate a SWAG estimate; Software Engineering; retrieved on Oct. 20, 2023 (Year: 2019).*
Jine Tseng et al.; Real-Time Software Life Cycle with the Model System; IEEE; pp. 358-373; retrieved on May 21, 2025 (Year: 1986).*

* cited by examiner

*Primary Examiner* — S. Sough
*Assistant Examiner* — Cuong V Luu
(74) *Attorney, Agent, or Firm* — Lee & Hayes, P.C.

(57) ABSTRACT

A timeline generation and solving tool is provided to parameterize a project at an application lifecycle management ("ALM") tool, and generate and solve a timeline of features according to the parameterized project. The Scrum master may re-parameterize the project, causing a new timeline to be generated, solved, and visualized. In this fashion, the Scrum master may rapidly prototype many project parameterizations, resulting in many possible timelines.

11 Claims, 4 Drawing Sheets

CASCADING ADAPTIVE TIMELINE GENERATION AND SOLVING

RELATED APPLICATIONS

This application claims the benefit of and is a non-provisional of U.S. Patent Application No. 63/225,393, filed Jul. 23, 2021, and entitled "CASCADING ADAPTIVE TIMELINE GENERATION AND SOLVING", the disclosure of which is incorporated by reference herein in its entirety for all purposes.

BACKGROUND

Agile software development is premised upon managing software development projects by adaptively planning project milestones, without overly rigid planning, so that development plans may be modified in response to changes in project parameters without substantially disrupting developer workflow. For example, according to Scrum frameworks for software development, projects are undertaken by a number of teams each working to achieve various targets, where each target is to be completed within a timeframe set by a Scrum master.

In increasingly complex modern software development projects, a product may be made up of numerous features to be completed by a variety of teams. In order for members of each team to complete each task and transition to their next assigned task on a timely basis in line with the ultimate endpoint of the project. Due to the nature of Scrum entailing a series of fast-paced "sprints," in which team members are meant to be fully focused on completing a task within a set time, the Scrum master bears the sole responsibility of organizing tasks and timeframes so that teams may complete sprints without being disrupted by scheduling errors, such as deadlines which cannot be completed in time, or one feature being impossible to implement due to inter-feature dependencies.

Furthermore, due to the adaptive practices of agile development, Scrum masters must generate feature roadmaps in a timely fashion, and, furthermore, revise roadmaps in a responsive fashion upon changes to a project taking effect. Scrum masters commonly employ application lifecycle management ("ALM") tools (such as VersionOne made by CollabNet of Alpharetta, Georgia) in order to plan features, timeframes, and roadmaps using a common platform accessible by team members. However, though ALM tools may function to provide teams with schedules, in highly complex projects involving many teams and numerous features (which may further include inter-feature dependencies), the planning and revising of such plans within actionable response timeframes is left up to the human judgment of the Scrum master. Such complex and interdependent logistical organization based on project parameters presents a challenging problem for individuals to mentally solve with reliable accuracy and in potentially many iterations, since ALM tools still rely on humans to accurately create and input timelines for their functionality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to generating and solving timelines of features, and more specifically implementing methods and systems interfacing with application lifecycle management ("ALM") tools for parameterizing a project at an ALM tool and generating and solving timelines of features in a cascading manner.

Figure 1:
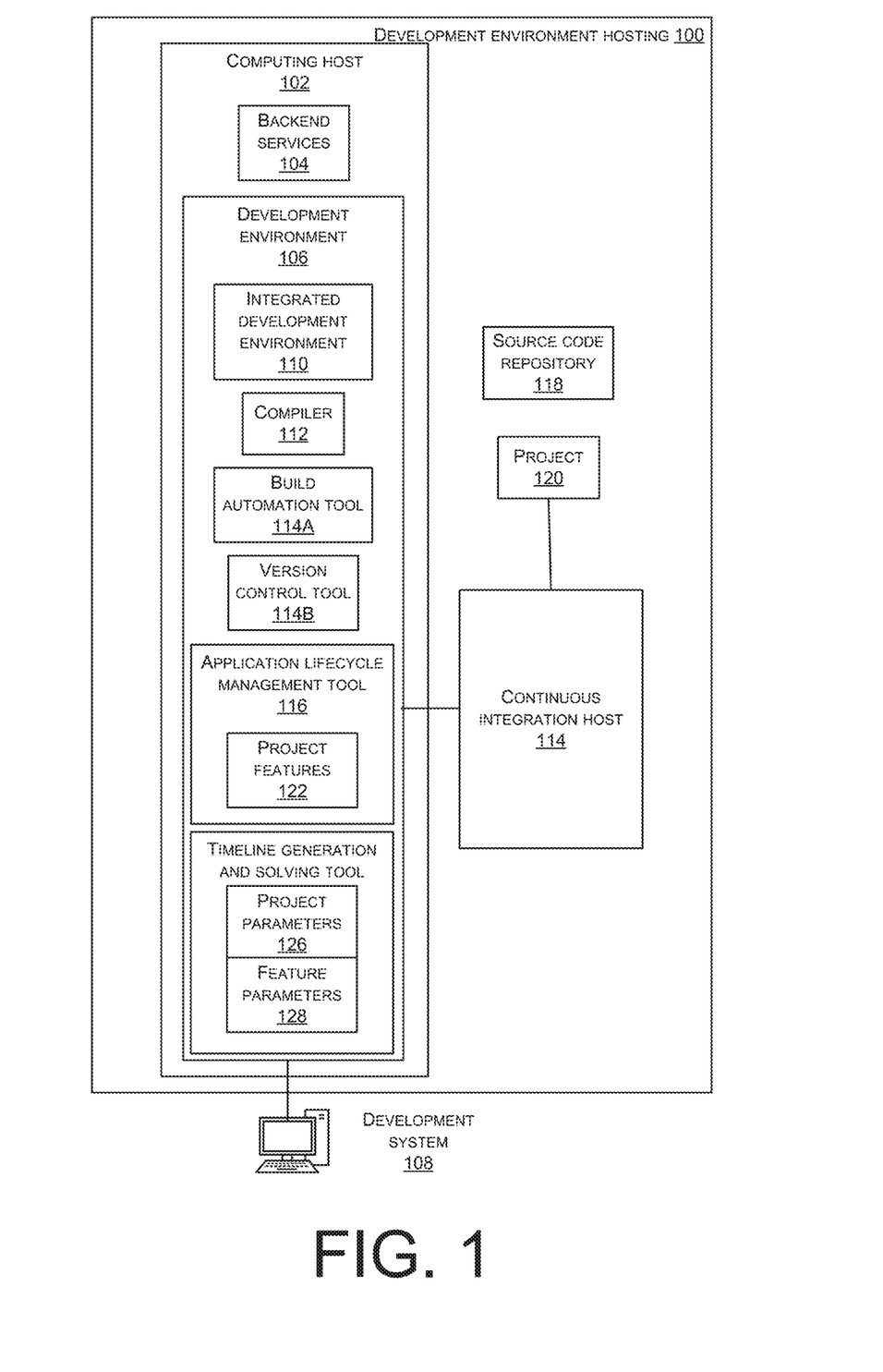
FIG. 1 illustrates an architectural diagram of development environment hosting according to example embodiments of the present disclosure.

FIG. 1 illustrates an architectural diagram of development environment hosting 100 according to example embodiments of the present disclosure. According to example embodiments of the present disclosure, development environment hosting 100 includes one or more computing hosts 102 including computing resources such as physical and/or virtual processors, memory, storage, computer-executable applications, computer-readable data, and the like. Additionally, over one or more computer networks, the one or more computing hosts 102 may receive inbound traffic from external hosts originating from outside networks, such as personal area networks ("PANs"), wired and wireless local area networks ("LANs"), wired and wireless wide area networks ("WANs"), the Internet, and so forth, which may pass through gateways, firewalls, and the like.

Computing hosts 102 of the development environment hosting 100 may be servers which provide computing resources for each other as well as for client devices (not illustrated) which connect to the computing hosts 102 over one or more computer networks. These computing resources may include, for example, computer-executable applications, databases, platforms, services, virtual machines, and the like.

According to example embodiments of the present disclosure, computing resources hosted by computing hosts 102 users of client devices may include backend services 104, a development environment 106, and development tools. Such computing resources may be provided for development systems 108 which connect to the computing hosts 102 over one or more computer networks. According to example embodiments of the present disclosure, computing resources hosted by computing hosts 102 may include an integrated development environment ("IDE") 110 and a compiler 112. Furthermore, one or more computing hosts 102 may be configured as a continuous integration ("CI") host 114, which is configured to integrate with build automation tools 114A such as Apache Maven and the like, and version control tools 114B such as Git, CVS, Apache Subversion, and the like.

The integration of an IDE 110, a compiler 112, and a build automation tool 114A with a CI host 114 enable operators of a development system 108 to connect to the computing hosts 102 and access these computing resources, as well as the CI host 114, to build, test, and deploy customized object code to be run in the context of end user-facing Web applications. For example, a user operating a development system 108 may connect to computing hosts 102 of a service cloud network 100, and run remotely an IDE 110 hosted at one or more computing hosts 102 (or run a local copy of the IDE 110 downloaded to the development system 108) to write source code defining computer-executable applications and various functions thereof.

The user may operate the IDE 110 to trigger a commit of the source code. A version control tool 114B, being integrated with the IDE 110, may be configured to record changes made by the user as a revision of an underlying source code repository, such as a revision on a development branch, using version control techniques as known to persons skilled in the art.

Alternatively, any combination of the IDE 110, the CI host 114, the build automation tool 114A, the version control tool 114B, and otherwise elements of the development environment 106 and the development system 108 may be configured to, individually or in combination, trigger a compile of the commit code, a merge of a development branch of the source code with a main branch, and otherwise trigger a commit of the source code as described herein.

The CI host 114, being integrated with the version control tool 114B, may be configured to perform a build of the revision by triggering compilation of a collection of class files in a project each as respective object code, and package all respective object code in a directory hierarchy in an application file. The CI host 114 may further be configured to trigger testing of the built application file. In the event that the revision to the source code passes testing, the CI host 114 may further be configured to trigger merging of the revision branch to the main source code repository 118, and trigger deployment of the built application file in a runtime environment, in succession.

A CI host 114, being integrated with a version control tool 114B and a build automation tool 114A, may automate the building and testing of target object code upon a developer committing a source code revision. The CI host 114 may autonomously report test failures to prompt developers to correct errors that led to those test failures, or may autonomously merge branch revisions into the source code repository 118 upon all tests successfully passing.

According to example embodiments of the present disclosure, the hosted computing resources further include an application lifecycle management ("ALM") tool 116. By way of example, an ALM tool 116 can be VersionOne, made by CollabNet of Alpharetta, Georgia. The ALM tool 116 may be part of the development environment 106. The ALM tool 116 may further be integrated with the version control tool 114B, the build automation tool 114A, and the testing tool, so that the ALM tool 116 may access the source code repository 118 and revisions thereof managed by the version control tool 114B; may access a compiler 112 integrated with the build automation tool 114A; and may access a test suite generated by the testing tool.

According to example embodiments of the present disclosure, it should be understood that multiple users operating multiple development systems 108 may constitute a team of developers, and multiple teams may concurrently develop a same project 120 hosted in a same development environment 106. It should be understood that a project 120 may include numerous class files to be compiled collectively making up an application file. An ALM tool 116 can store project features 122 describing a project 120; these project features 122 can be stored as feature data records, as shall be described subsequently with reference to FIG. 2.

It should be understood that any user operating a development system 108 may operate a development system to connect to the computing hosts 102 and access the development environment 106, including the ALM tool 116, to retrieve and view a timeline of features (after such a timeline of features has been created). For example, a user operating a development system 108 may connect to a computing host 102, and run remotely an ALM tool 116 hosted at one or more computing hosts (or run a local copy of the ALM tool 116 downloaded to the development system 108) to retrieve and view a timeline of features. As illustrated in FIG. 1, the timeline is not yet created; furthermore, it should be understood that, according to example embodiments of the present disclosure, the timeline is not generated by the ALM tool 116, and the timeline does not originate from the ALM tool 126. Rather, the timeline originates from a timeline generation and solving tool 124, as shall be described in further detail subsequently.

A development system 108 connected to the computing hosts 102 may run the ALM tool 116 locally or remotely to retrieve a timeline (after a timeline has been created, such as, for example, after a timeline has been generated and solved according to example embodiments of the present disclosure), and to display the retrieved timeline on a display interface of the development system. The retrieved timeline may be reviewed by a user of the development system 108, so that the user may review the contents of a solved timeline, including solved feature assignments and solved project endpoints, as shall be described subsequently.

According to example embodiments of the present disclosure, computing resources hosted by computing hosts 102 may further include a timeline generation and solving tool 124. A user operating a timeline generating development system 108 may connect to a computing host 102, and run remotely the timeline generation and solving tool 124 hosted at one or more computing hosts 102 (or run a local copy of the timeline generation and solving tool 124 downloaded to the development system 108) to parameterize a project 120 by storing project parameters 126 at the timeline generation and solving tool 124, and generate and solve a timeline of features according to project parameters 126, as shall be described subsequently.

According to example embodiments of the present disclosure, the timeline generation and solving tool 124 may configure computing hosts 102 to exchange data between the ALM tool 116 and the timeline generation and solving tool 124, over communication interfaces of computing hosts 102. Commands may be representational state transfer ("REST") application programming interface ("API") commands, such as WebHDFS according to Hadoop® implementations. Where commands are implemented as REST API commands, the timeline generation and solving tool 124 may be configured to one host among a cluster of computing hosts.

It should further be understood that a timeline generating user, such as a Scrum master according to Scrum practices as known to persons skilled in the art, may operate a timeline generating development system 108 to connect to the computing hosts 102 and access the timeline generation and solving tool 124, to parameterize a project 120 by storing project parameters 126, and generate a timeline of features. For example, a Scrum master user operating a development system 108 may connect to a computing host 102, and run remotely a timeline generation and solving tool 124 hosted at one or more computing hosts 102 (or run a local copy of the timeline generation and solving tool 124 downloaded to the timeline generating development system 108) to parameterize a project 120 by storing project parameters 126, and generate a timeline of features.

According to example embodiments of the present disclosure, the timeline generation and solving tool 124 may store project parameters 126 which have been defined by a Scrum master to parameterize a project 120 stored in the development environment 106. Project parameters 126 may include, for example, a number of teams assigned to development of the project 120; an average velocity among all teams assigned to development of the project (where, in accordance with Scrum practices as known to persons skilled in the art, it should be understood that "velocity" is not a measure over time, but rather a measure over "sprints," iterations of work as defined by Scrum practices), which may, in accordance with Scrum practices as known to persons skilled in the art, be measured in units of story points (where, in accordance with Scrum practices as known to persons skilled in the art, it should be understood that "story points" are comparative measures of effort and complexity of different tasks in software development) per sprint.

Furthermore, project parameters 126 can include feature parameters 128, which can be optionally defined for each feature of the project features 122, rather than defined for the project 120 as a whole. Feature parameters 128 can include a Swag of a feature of the project features 122 (where a Swag is a term of art referring to an estimation of effort and complexity of a feature, comparative to other features, by a Scrum master or another timeline generating user), and can include a story point estimate of a feature of the project features 122. According to Scrum practices as known to persons skilled in the art, it should be understood that Swag and a story point estimate can be parameterized for a same feature, with both Swag and the story point estimate being estimates of effort and complexity of the same feature, comparative to other features; that Swag can be, but need not be, also measured in story points, as long as Swags for different features are proportional to each other (e.g., a doubled Swag represents approximately doubled effort and complexity); and that the comparison of Swag and a story point estimate to each other for the same feature (regardless of whether they are similar or different in proportion for the same feature) can provide information of interest to Scrum masters and other persons skilled in the art due to the different methodologies used to derive Swag and story point estimates.

It should be understood that, according to example embodiments of the present disclosure, a feature can be parameterized with either or both of Swag and a story point estimate.

Furthermore, feature parameters 128 can include a planned start date and a planned end date of a feature. Furthermore, feature parameters 128 can include whether a feature is determined to be blocked by a Scrum master. The purposes of these feature parameters shall be described subsequently with reference to FIG. 2 and FIG. 3.

It should be understood that project parameters 126 and feature parameters 128 are not part of a timeline generated according to example embodiments of the present disclosure. Rather, project parameters 126 and feature parameters 128 can be stored at the timeline generation and solving tool 124 during a timeline solving process as subsequently described with reference to FIG. 3.

Figure 2:
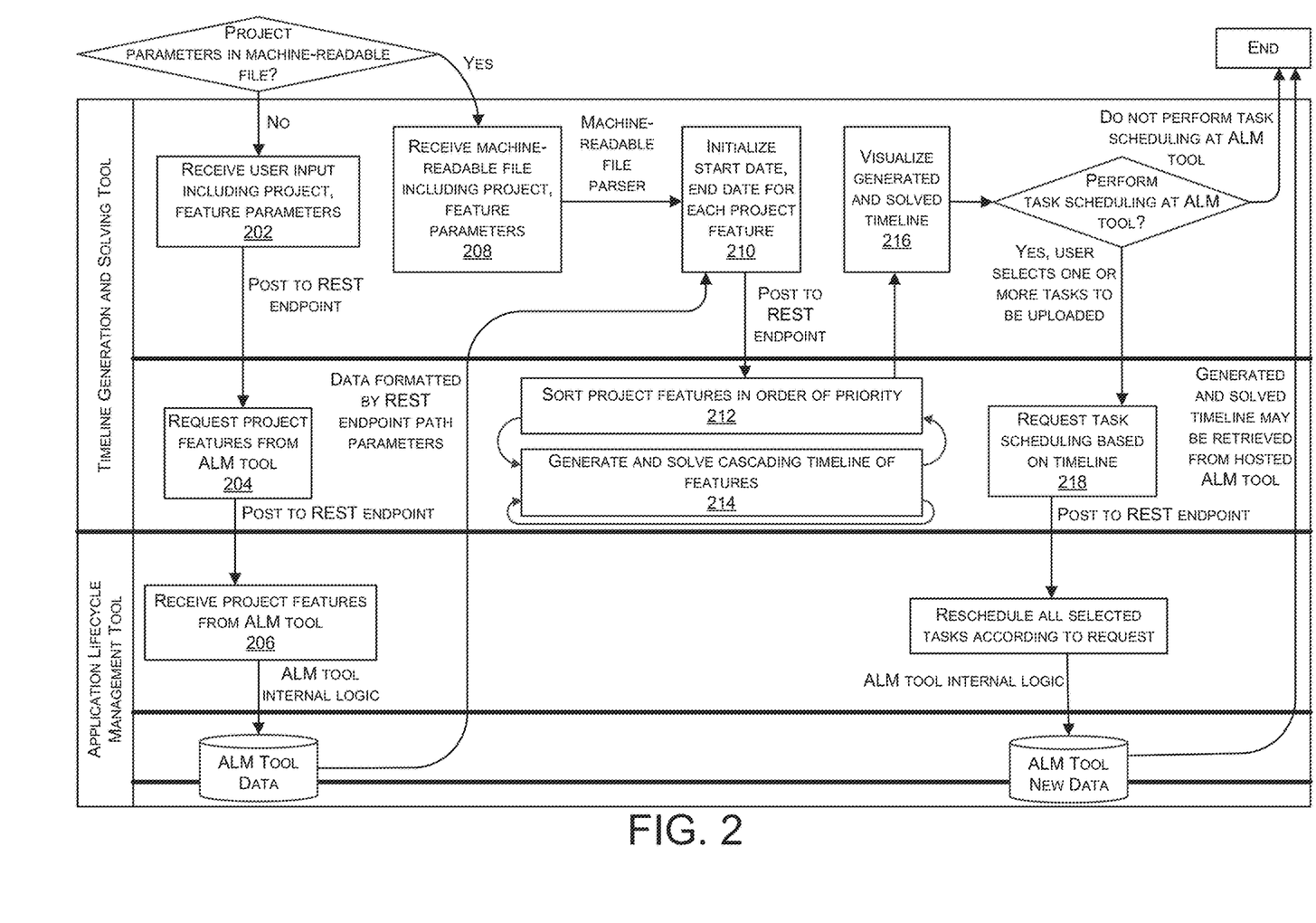
FIG. 2 illustrates a flowchart of communications between a timeline generation and solving tool and an ALM tool according to example embodiments of the present disclosure.

FIG. 2 illustrates a flowchart of communications between a timeline generation and solving tool and an ALM tool, which may be both hosted and running remotely on computing hosts according to example embodiments of the present disclosure, or the timeline generation and solving tool may be running locally on a timeline generating development system while the ALM tool runs remotely on a computing host. A user may begin to parameterize a project at the timeline generation and solving tool by configuring the timeline generation and solving tool to receive input project parameters and feature parameters, and requesting the ALM tool to return project features, as illustrated by a flow starting at step 202. Alternatively, a user may begin to parameterize a project at the timeline generation and solving tool by uploading a machine-readable file containing feature parameters to the timeline generation and solving tool, as illustrated by a flow starting at step 208.

At a step 202, the timeline generation and solving tool configures a computing host or computing system to receive user input including project parameters and feature parameters. A Scrum master may operate a timeline generating development system to enter each of the above-described project parameters and feature parameters into the timeline generating and solving tool running remotely or locally at the timeline generating development system.

For example, a Scrum master can operate a timeline generating development system to enter into the timeline generating and solving tool project parameters such as a number of teams assigned to development of the project, and an average velocity among all teams assigned to development of the project. Furthermore, a Scrum master can operate a timeline generating development system to enter into the timeline generating and solving tool, for a feature of the project, feature parameters such as either or both of a Swag of the feature and a story point estimate of the feature. The timeline generating and solving tool configures a computing host to store each such project parameter and feature parameter that is entered.

At a step 204, the timeline generation and solving tool configures a computing host or computing system to request project features from the ALM tool. The timeline generation and solving tool may configure a computing host or computing system to request, according to REST API commands as described above, the ALM tool to return some number of data records, each data record storing fields describing a feature (subsequently a "feature data record") defined according to project features of a project hosted in the development environment. One feature data record can correspond to each individual feature to be implemented in the course of developing the project.

A field of a feature data record can describe a dependency of a respective feature upon any other feature; for example, a first feature may need to be completed before a second feature may be implemented. Thus, a feature data record can include a dependency field indicating a dependency, or indicating no dependency.

A field of a feature data record can describe a priority ranking of a respective feature. It should be understood that for the purpose of example embodiments of the present disclosure, each feature may have a different priority ranking compared to each other feature. Therefore, all features of a same project may be ranked from highest to lowest priority, without any ties or overlaps in priority; each feature data record can include a priority field having a value which is different from priority field values of each other feature data record for project features of a same project.

It should be understood that features of a project, which need not correspond one-to-one to class files of a project, are stored by an ALM tool during the course of teams implementing these features; any modification of the project features should be performed by operating the ALM tool, which is beyond the scope of the present disclosure. However, because the project features are stored by an ALM tool, a Scrum master is limited to operating interfaces of the ALM tool in order to view and interact with the project features (i.e., viewing units of work, viewing inter-feature dependencies, and exporting this information for additional computations), and the Scrum master cannot conveniently view or interact with the project features outside of running the ALM tool on a computing system; such limitations are not conducive to generating and solving a timeline for features of the project in a responsive manner. ALM tools cannot receive or store information of the nature as described above with reference to project parameters and feature parameters, and thus also does not facilitate the correlation of project features to project parameters, or project features to feature parameters.

At a step 206, the timeline generation and solving tool configures a computing host or computing system to receive project features from the ALM tool. It should be understood that project features have been packaged in a standardized format as defined according to the ALM tool (including, but not being limited to, at least the elements of a feature data record as described above), and the timeline generation and solving tool configures a computing host or computing system to parse this ALM tool format.

At a step 208, the timeline generation and solving tool configures a computing host or computing system to receive a user-uploaded machine-readable file including project parameters and feature parameters. Such information is substantially similar to that which is input by the user in step 202, and thus step 208 can be performed as an alternative to step 202. Such information may be formatted in a general-purpose machine-readable file format, such as a Microsoft Excel file.

At a step 210, the timeline generation and solving tool configures a computing host or computing system to initializes a start date and an end date for each project feature.

The ALM tool does not store project features with start dates and end dates. Instead, the timeline generation and solving tool creates planning feature data records, one corresponding to each feature of the project features. Each of these multiple planning feature data records includes, in addition to the fields of feature data records as described above, a Swag field and a story point estimate field storing, respectively, Swag and story point estimate project parameters which may, or may not, have been entered for each respective project feature. Unlike feature data records which are received from the ALM tool, planning feature data records are used internally by the timeline generation and solving tool, and are not returned to the ALM tool.

In addition, each planning feature data record includes a start date field and an end date field. In step 210, the start date field and the end date field need not yet be populated with date values. Even if the start date field and the end date field are populated with date values at step 210, they should be understood as planned start dates and end dates entered by a Scrum master as feature parameters, but not necessarily finalized. Subsequently, during step 214, the timeline generation and solving tool can configure a computing host or computing system to generate and solve a timeline, while populating each start date field and each end date field of the planning feature data records.

At a step 212, the timeline generation and solving tool configures a computing host or computing system to sort project features in order of priority.

By way of example, the project features can be sorted in ascending order of priority or descending order of priority, depending on whether higher priority values or lower priority values represent greater priority according to an ALM tool. The sorted features are thus a data structure that can be traversed in order of priority.

It should be understood that results of sorting project features are dependent on the project feature information returned by the ALM tool; neither the project features themselves, nor the outcome of project feature sorting, depend on project parameterization.

At a step 214, the timeline generation and solving tool configures a computing host or computing system to generate and solve a cascading timeline of features based on the project features, the project parameters, and the feature parameters. The timeline generation and solving process is described in further detail subsequently.

For the purpose of understanding example embodiments of the present disclosure, it should be understood that the "solving" of a timeline includes at least populating the start date field and the end date field of each timeline data record with a solved start date value and a solved end date value, respectively.

The "cascading" nature of the generated timeline to be solved, according to example embodiments of the present disclosure, may be understood as referring to the fact that the timeline of features is solved by sequentially traversing each of the timeline data records representing project features in accordance with project parameterization; therefore, the timeline is solved one feature (as represented by a timeline data record) at a time, where a solved start date and a solved end date of each timeline record depends on all previous solved start dates and solved end dates, in a cascading manner. Any change to project parameters, therefore, may cause a cascade of changes to all subsequent solved start dates and solved end dates in the timeline.

It is not desired to avoid such cascading in the solving of timelines according to example embodiments of the present disclosure. Such cascading reflects the nature of Scrum-based scheduling of sprints, as well as the cascade of changes that results from changes to feature parameters such as Swag and story point estimates. Instead, according to example embodiments of the present disclosure, it is desired to compute the cascading solving of timelines as quickly as possible, with speeds considerably faster than the human mind can accomplish, so that the in-person Scrum process can proceed at a brisk pace among all team members without burdening the Scrum master with time-consuming mental computations, and it is also desired to adaptively solve any cascading changes to a timeline that result from changed feature parameters, so as to avoid unduly delaying the in-person Scrum process.

Figure 3:
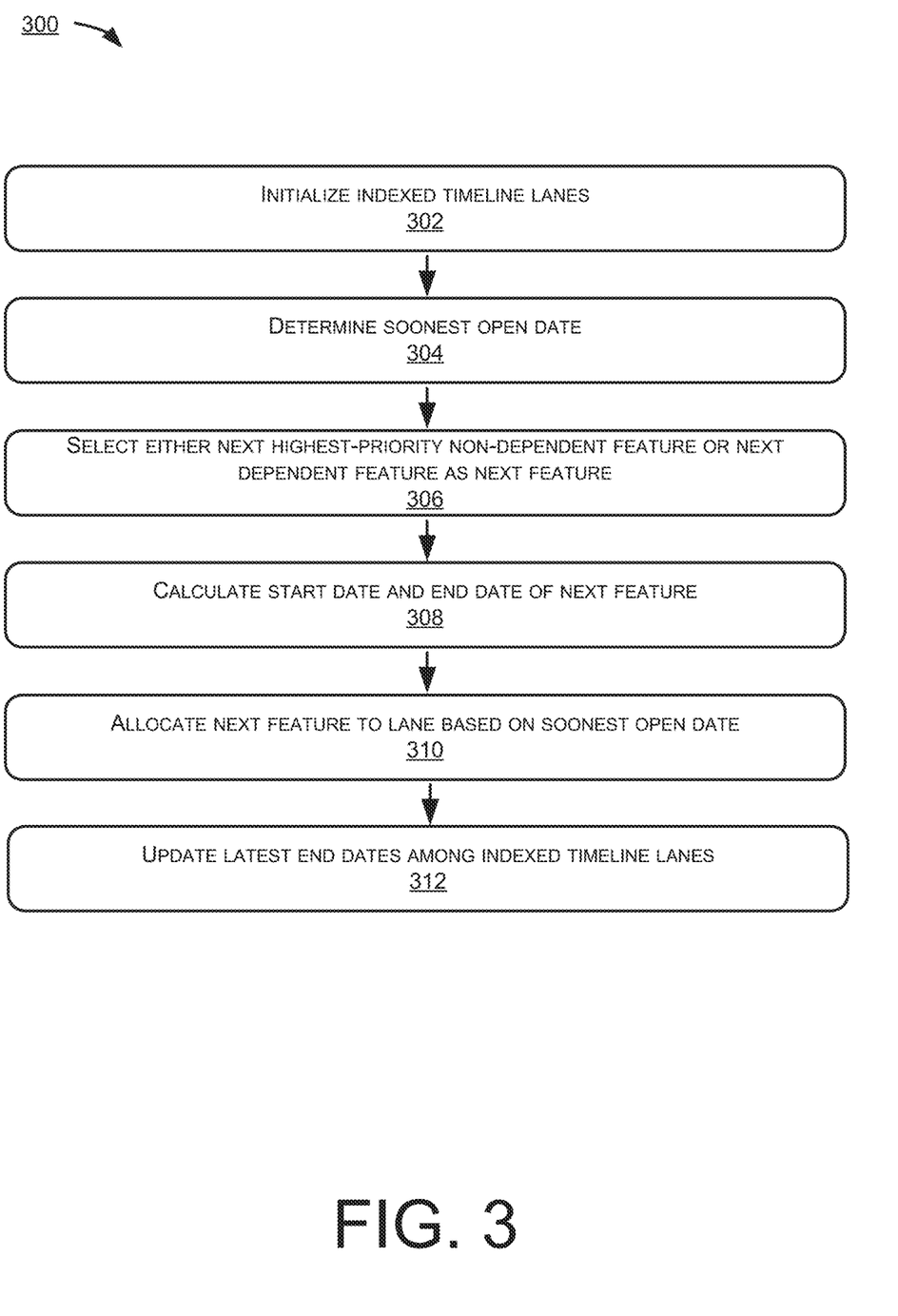
FIG. 3 illustrates a flowchart of a timeline solving process according to example embodiments of the present disclosure.

FIG. 3 illustrates a flowchart of a timeline solving process 300 according to example embodiments of the present disclosure. The timeline solving process 300 provides an example of step 214 as illustrated in FIG. 2.

At a step 302, the timeline generation and solving tool configures a computing host or computing system to initialize indexed timeline lanes. By way of example, based on the number of teams as specified in project parameters, the timeline generation and solving tool creates one indexed timeline lane for each team. The timeline lanes can be defined using any indexed data structure, where each index represents a different team. In particular, each "lane" of the indexed timeline lanes may track a latest end date for features allocated to the team of that lane. As project features are allocated to different lanes for different teams, the timeline is solved feature by feature, in turn, until all project features are allocated to a lane.

At a step 304, the timeline generation and solving tool configures a computing host or computing system to determine a soonest open date.

By way of example, the timeline generation and solving tool can configure a computing host to look up a soonest open date among the indexed timeline lanes. By looking up a latest end date for each lane, the earliest end date among the latest end dates of all teams can be determined as a soonest open date; this represents the earliest available date among all of the teams to begin implementing another feature, according to the timeline as solved so far.

At a step 306, the timeline generation and solving tool configures a computing host or computing system to select either a next highest-priority non-dependent feature or a next dependent feature as a next feature.

By way of example, the computing host or computing system traverses the features sorted in order of priority, then proceeds to the next highest feature in order of priority which has not yet been allocated to the solved timeline. In the event that the next highest feature is not a dependent feature (as described above), the computing host or computing system selects the next highest feature. However, in the event that the next highest feature is a dependent feature, the computing host removes the next highest feature from the sorted features and adds it to an indexed list of dependent features.

If any sorted features remain, the computing host then compares priorities of a next highest feature among the sorted features and a next dependent feature in the indexed list of dependent features. The next dependent feature is selected in the event that its planned starting date is earlier than the soonest open date and it is higher in priority than the next highest feature. Otherwise, the next highest feature is selected as a next feature.

If no sorted features remain, the next dependent feature is selected as a next feature.

At a step 308, the timeline generation and solving tool configures a computing host or computing system to calculate a start date and an end date of the next feature.

By way of example, the computing host or computing system can use the soonest open date, as described above, as a start date.

By way of example, the computing host can compute an end date according to average velocity among all teams as described above, convert units of Swag or units of story point estimates parameterized for each project feature into time durations in a number of days. This number of days can then be added to the start date to yield the end date.

It should further be understood that a feature may be blocked for various reasons such that a team cannot start implementing the feature as soon as another feature is completed by another team. For example, the feature may have a dependency upon another feature which has not yet been completed at this start date. Alternatively, project parameterization may indicate that the feature is blocked for various reasons that a Scrum master has determined.

Upon calculating an end date for a feature which is blocked, the timeline generation and solving tool may configure a computing host or computing system to add a number of days to that end date. An unblocking process, according to example embodiments of the present disclosure, represents a time cost required for a team to resolve any real-world developmental and logistical obstacles which prevent implementing a feature of the project. For the purpose of understanding example embodiments of the present disclosure, the timeline generation and solving tool may configures a computing host or computing system to add a common time duration (such as, by way of example, 10 days) to end dates to represent all unblocking processes.

The timeline generation and solving tool can further configure a computing host or computing system to further add a time buffer to the end date.

At a step 310, the timeline generation and solving tool configures a computing host or computing system to allocate the next feature to a lane based on the soonest open date.

By way of example, according to the lane among the indexed timeline lane that returned the soonest open date, a team field of a planning feature data record corresponding to the next feature is assigned the index of that lane. Thus, the next feature is associated with the team having the soonest open date.

The timeline generation and solving tool may configure a computing host or computing system to set an implementing status for every allocated feature; this indicates that the feature has been incorporated into the solved timeline (i.e., the feature has been assigned to a team), and that the feature does not need to be traversed again during the current iteration of the process 300.

At a step 312, the timeline generation and solving tool configures a computing host or computing system to update latest end dates among the indexed timeline lanes.

For the team that received the allocation of the next feature, a corresponding lane of the indexed timeline lanes is updated with the end date of the next feature. This end date can be further incremented by some number of days, such as by one day, to represent the fact that teams cannot necessarily begin implementing another feature on the very next day after finishing a feature.

In this fashion, the timeline generation and solving tool performs computations based on the project features as recorded by the ALM tools, combined with Scrum master-defined velocities, which ALM tools are not designed to record or perform computations based thereupon. In this fashion, a timeline generation and solving tool enables information stored by an ALM tool to be computed using additional information, without incurring undue time cost in retrieving the project features or converting project features to a common format suitable for computations based on working speeds. Since the timeline generation and solving tool thereby solves the timeline, one feature at a time, in a cascading fashion, the timeline is solved much more expeditiously than through manual labor, so that the in-person Scrum process can proceed at a brisk pace among all team members without burdening the Scrum master with time-consuming mental computations.

After all project features are traversed, the timeline generation and solving tool configures a computing host or computing system to use a latest time counter of the timeline (without a time buffer added) as a project endpoint time. The project endpoint time indicates a completion time for the entire project, according to the solved timeline.

At a step 216, the timeline generation and solving tool configures a computing host or computing system to visualize the generated and solved timeline.

The timeline generation and solving tool may configure a computing host or computing system to represent the multiple-lane timeline as a visual graph having multiple lanes drawn along a time dimension. Along the time dimension, each feature may be represented as an interval spanning its start time and end time. Additionally, in between features, downtime intervals may be represented as blank space. The timeline generation and solving tool may configures a computing host or computing system to generate the visual graph in a web-hosted format such as Google Charts.

It should be understood that a Scrum master may view the visualized timeline in a display interface of the timeline generating development system, for purposes such as decision-making which may lead into the subsequent step 218. The Scrum master may then make inputs through an input interface of the timeline generating development system, which may determine whether the subsequent step 218 is performed, or is skipped.

At a step 218, the timeline generation and solving tool requests task scheduling based on the timeline from the ALM tool.

It should be understood that, within the timeline generation and solving tool, the timeline itself does not assign team members to perform tasks to implement each feature, does not notify team members of assignments, does not set deadlines and notify team members of deadlines, and the like. Thus, in order for the timeline to take effect upon the ongoing development of a project, the timeline generation and solving tool configures a computing host or computing system to export the timeline to a request forwarded to the ALM tool according to a REST API as described above.

After step 218, it may be understood that the ALM tool performs steps as known in the art to implement the timeline (as specified in the REST API request) as a sequence of task assignments and deadlines. The timeline itself remains in the timeline generation and solving tool, and is not exposed to the ALM tool, as the ALM tool cannot parse the contents of the generated timeline.

Thereafter, as described above, a development system connected to the computing hosts may run the ALM tool locally or remotely to retrieve a timeline, and to display the retrieved timeline on a display interface of the development system. The retrieved timeline may be reviewed by a user of the development system, so that the user may review the contents of a solved timeline, including solved feature allocations and solved project endpoints. In this fashion, the generated and solved timeline may be responsively deployed to replace previous project task assignments, and team members may receive their reassigned tasks on a timely basis.

In the event that the Scrum master does not choose to perform step 218, it may be skipped. For example, the Scrum master may determine that the visualized timeline indicates that the project parameters were set incorrectly, or the project parameters were not set in an optimized fashion. The Scrum master may then choose to return to step 202 and re-parameterize the project, causing a new timeline to be generated, solved, and visualized. In this fashion, the Scrum master may rapidly prototype many project parameterizations, resulting in many possible timelines. Without the use of a timeline generation and solving tool which interfaces with an ALM tool, retrieves project features, and converts project features to a common format suitable for computations based on working speeds, a Scrum master would need to generate and check a timeline by hand, and work indirectly by manually copying data out of the ALM tool, leading to a slow and potentially error-prone project roadmapping process which does not permit rapid prototyping of possible timelines.

Figure 4:
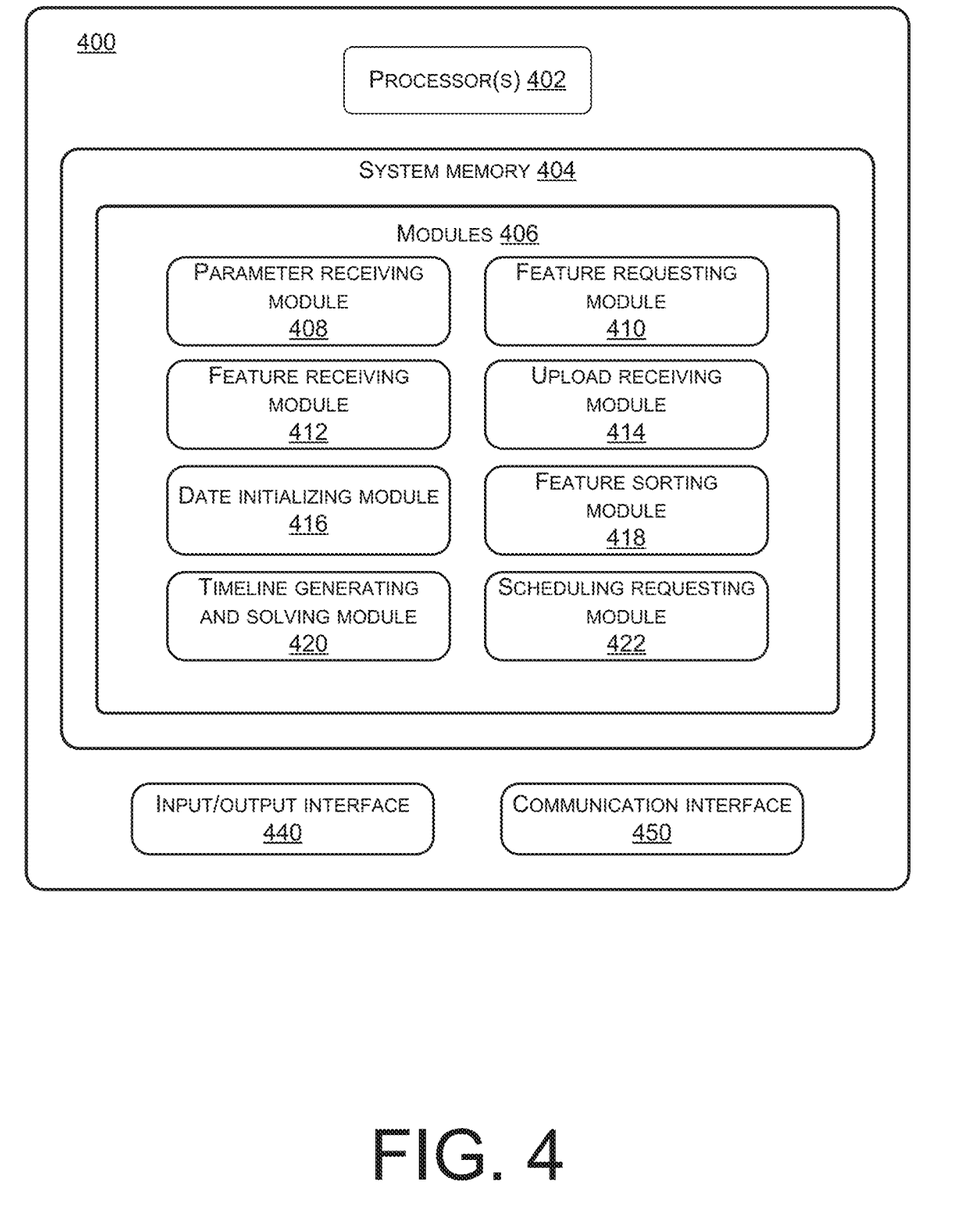
FIG. 4 illustrates an example computing host or computing system for implementing the processes and methods described herein for implementing generating and solving timelines of features.

FIG. 4 illustrates an example computing host 400 or computing system for implementing the processes and methods described above for implementing timeline generation and solving.

The techniques and mechanisms described herein may be implemented by multiple instances of the computing host 400, as well as by any other computing device, system, and/or environment. The computing host 400 may be any varieties of computing devices, such as personal computers, personal tablets, mobile devices, and other such computing devices. The computing host 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing host 400 may include one or more processors 402 and system memory 404 communicatively coupled to the processor(s) 402. The processor(s) 402 and system memory 404 may be physical or may be virtualized and/or distributed. The processor(s) 402 may execute one or more modules and/or processes to cause the processor(s) 402 to perform a variety of functions. In embodiments, the processor(s) 402 may include a central processing unit ("CPU"), a graphics processing unit ("GPU"), any combinations thereof, or other processing units or components known in the art. Additionally, each of the processor(s) 402 may possess its own local memory, which also may store program modules, program data, and/or one or more operating systems.

Depending on the exact configuration and type of the computing host 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, a parameter receiving module 408, a feature requesting module 410, a feature receiving module 412, an upload receiving module 414, a timeline generating module 416, a feature sorting module 418, a timeline solving module 420, and a scheduling requesting module 422.

The parameter receiving module 408 may be configured to receive user input including project parameters as described above with reference to FIG. 2.

The feature requesting module 410 may be configured to request project features from an ALM tool as described above with reference to FIG. 2.

The feature receiving module 412 may be configured to receive project features from the ALM tool as described above with reference to FIG. 2.

The upload receiving module 414 may be configured to receive a user-uploaded machine-readable file including project parameters as described above with reference to FIG. 2.

The date initializing module 416 may be configured to initialize a start date and an end date for each project feature as described above with reference to FIG. 2.

The feature sorting module 418 may be configured to sort project features in order of priority as described above with reference to FIG. 2.

The timeline generating and solve module 420 may be configured to generate and solve a cascading timeline of features as described above with reference to FIG. 2.

The scheduling requesting module 422 may be configured to request task scheduling based on the timeline from the ALM tool as described above with reference to FIG. 2.

The computing host 400 may additionally include an input/output ("I/O") interface 440 and a communication module 450 allowing the computing host 400 to communicate with other systems and devices over a network, such as other computing hosts of the development environment hosting as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
generating and solving, at a computing system, a first cascading timeline of a plurality of project features received from an application lifecycle management (ALM) tool and based on a first plurality of project parameters and a plurality of feature parameters, wherein the generating and solving the first cascading timeline comprises sequentially traversing timeline data records representing the plurality of project features to determine a start date and an end date for individual features of the plurality of project features based on the first plurality of project parameters and a previously solved start date and a previously solved end date for a previous individual feature of the plurality of project features of the first cascading timeline;
configuring, by the computing system, a computing host to generate, using the plurality of project features, a first visualization of the first cascading timeline comprising first indications of the start date and the end date for the individual features of the plurality of project features;
receiving, at the computing system from the computing host, an input indicating a requested modification to a parameter of the first plurality of project parameters; and
in response to the input:
modifying, at the computing system, the parameter of the first plurality of project parameters to generate a modified parameter based on the input;
generating, at the computing system, a second plurality of project parameters comprising the modified parameter;
generating and solving, at the computing system, a second cascading timeline of the plurality of project features based on the second plurality of project parameters and the plurality of feature parameters, wherein the generating and solving the second cascading timeline comprises:
sequentially traversing the timeline data records representing the plurality of project features to determine an updated start date and an updated end date for the individual features of the plurality of project features based on the second plurality of project parameters and an updated previously solved start date and an updated previously solved end date for an updated previous individual feature of the plurality of project features of the second cascading timeline;
initializing indexed timeline lanes;
allocating a next feature to a lane of the indexed timeline lanes based on a soonest open date;
updating latest end dates among the indexed timeline lanes; and calculating a start date and an end date of the next feature, wherein the calculating the end date of the next feature comprises, according to an average velocity project parameter, converting units of a Swag feature parameter or units of a story point estimate feature parameter into a number of days, and adding the number of days to the start date of the next feature;

configuring, by the computing system, the computing host to generate, using the plurality of project features, a second visualization of the second cascading timeline comprising second indications of the updated start date and the updated end date for the individual features of the plurality of project features; and executing, at the ALM tool, a task associated with the second cascading timeline by compiling object code comprising the modified parameter to generate a revision of code associated with the plurality of project features.

2. The method of claim 1 further comprising:
executing, at the ALM tool in response to the input, a commit of the object code at a version control tool.

3. The method of claim 1, wherein the generating and solving the second cascading timeline further comprises determining the soonest open date by looking up a latest end date for each lane among the indexed timeline lanes.

4. The method of claim 1, wherein the generating and solving the second cascading timeline comprises selecting the next feature from a next highest-priority non-dependent feature or a next dependent feature.

5. A computing host comprising:
one or more processors; and
memory communicatively coupled to the one or more processors, the memory storing computer-executable modules executable by the one or more processors that, when executed by the one or more processors, perform operations comprising:
generating and solving, at a computing system, a first cascading timeline of a plurality of project features received from an application lifecycle management (ALM) tool and based on a first plurality of project parameters and a plurality of feature parameters, wherein the generating and solving the first cascading timeline comprises sequentially traversing timeline data records representing the plurality of project features to determine a start date and an end date for individual features of the plurality of project features based on the first plurality of project parameters and a previously solved start date and a previously solved end date for a previous individual feature of the plurality of project features of the first cascading timeline;
configuring, by the computing system, a computing host to generate, using the plurality of project features, a first visualization of the first cascading timeline comprising first indications of the start date and the end date for the individual features of the plurality of project features;
receiving, at the computing system from the computing host, an input indicating a requested modification to a parameter of the first plurality of project parameters; and
in response to the input:
modifying, at the computing system, the parameter of the first plurality of project parameters to generate a modified parameter based on the input;

generating, at the computing system, a second plurality of project parameters comprising the modified parameter;
generating and solving, at the computing system, a second cascading timeline of the plurality of project features based on the second plurality of project parameters and the plurality of feature parameters, wherein the generating and solving the second cascading timeline comprises:
sequentially traversing the timeline data records representing the plurality of project features to determine an updated start date and an updated end date for the individual features of the plurality of project features based on the second plurality of project parameters and an updated previously solved start date and an updated previously solved end date for an updated previous individual feature of the plurality of project features of the second cascading timeline;
initializing indexed timeline lanes;
allocating a next feature to a lane of the indexed timeline lanes based on a soonest open date;
updating latest end dates among the indexed timeline lanes; and
calculating a start date and an end date of the next feature, wherein the calculating the end date of the next feature comprises, according to an average velocity project parameter, converting units of a Swag feature parameter or units of a story point estimate feature parameter into a number of days, and adding the number of days to the start date of the next feature;
configuring, by the computing system, the computing host to generate, using the plurality of project features, a second visualization of the second cascading timeline comprising second indications of the updated start date and the updated end date for the individual features of the plurality of project features; and
executing, at the ALM tool, a task associated with the second cascading timeline by compiling object code comprising the modified parameter to generate a revision of code associated with the plurality of project features.

6. The computing host of claim 5, wherein the operations further comprise executing, at the ALM tool in response to the input, a merge of a development branch of the object code with a main branch of source code.

7. The computing host of claim 5, wherein the generating and solving the second cascading timeline further comprises determining the soonest open date by looking up a latest end date for each lane among the indexed timeline lanes.

8. The computing host of claim 5, wherein the generating and solving the second cascading timeline comprises selecting the next feature from one or more of a next highest-priority non-dependent feature or a next dependent feature.

9. A computer-readable storage medium storing computer-readable instructions executable by one or more processors that, when executed by the one or more processors, cause the one or more processors to perform operations comprising:
generating and solving, at a computing system, a first cascading timeline of a plurality of project features received from an application lifecycle management (ALM) tool and based on a first plurality of project parameters and a plurality of feature parameters, wherein the generating and solving the first cascading timeline comprises sequentially traversing timeline data records representing the plurality of project features to determine a start date and an end date for individual features of the plurality of project features based on the first plurality of project parameters and a previously solved start date and a previously solved end date for a previous individual feature of the plurality of project features of the first cascading timeline;

configuring, by the computing system, a computing host to generate, using the plurality of project features, a first visualization of the first cascading timeline comprising first indications of the start date and the end date for the individual features of the plurality of project features;

receiving, at the computing system from the computing host, an input indicating a requested modification to a parameter of the first plurality of project parameters; and in response to the input:
modifying, at the computing system, the parameter of the first plurality of project parameters to generate a modified parameter based on the input;

generating, at the computing system, a second plurality of project parameters comprising the modified parameter;

generating and solving, at the computing system, a second cascading timeline of the plurality of project features based on the second plurality of project parameters and the plurality of feature parameters, wherein the generating and solving the second cascading timeline comprises:

sequentially traversing the timeline data records representing the plurality of project features to determine an updated start date and an updated end date for the individual features of the plurality of project features based on the second plurality of project parameters and an updated previously solved start date and an updated previously solved end date for an updated previous individual feature of the plurality of project features of the second cascading timeline;

initializing indexed timeline lanes;

allocating a next feature to a lane of the indexed timeline lanes based on a soonest open date;

updating latest end dates among the indexed timeline lanes; and calculating a start date and an end date of the next feature, wherein the calculating the end date of the next feature comprises, according to an average velocity project parameter, converting units of a Swag feature parameter or units of a story point estimate feature parameter into a number of days, and adding the number of days to the start date of the next feature;

configuring, by the computing system, the computing host to generate, using the plurality of project features, a second visualization of the second cascading timeline comprising second indications of the updated start date and the updated end date for the individual features of the plurality of project features; and executing, at the ALM tool, a task associated with the second cascading timeline by compiling object code comprising the modified parameter to generate a revision of code associated with the plurality of project features.

10. The computer-readable storage medium of claim 9, wherein the generating and solving the second cascading timeline further comprises determining the soonest open date by looking up a latest end date for each lane among the indexed timeline lanes.

11. The computer-readable storage medium of claim 9, wherein the generating and solving the second cascading timeline comprises selecting the next feature from one or more of a next highest-priority non-dependent feature or a next dependent feature.

* * * * *